(12) United States Patent
Lim et al.

(10) Patent No.: US 12,457,842 B2
(45) Date of Patent: Oct. 28, 2025

(54) IMAGE SENSOR AND CAMERA AND ELECTRONIC DEVICE

(71) Applicant: SAMSUNG ELECTRONICS CO., LTD., Suwon-si (KR)

(72) Inventors: Seon-Jeong Lim, Yongin-si (KR); Seungjun Lee, Suwon-si (KR); Taeyon Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 523 days.

(21) Appl. No.: 17/835,090

(22) Filed: Jun. 8, 2022

(65) Prior Publication Data

US 2023/0030824 A1     Feb. 2, 2023

(30) Foreign Application Priority Data

Jul. 27, 2021     (KR) .................. 10-2021-0098498

(51) Int. Cl.
*H10K 39/32*     (2023.01)

(52) U.S. Cl.
CPC .................. *H10K 39/32* (2023.02)

(58) Field of Classification Search
CPC .. H10F 39/184; H10F 39/192; H10F 39/8053; H10F 39/8063; H10F 39/809; H10F 39/18; H10K 85/50
See application file for complete search history.

(56) References Cited

U.S. PATENT DOCUMENTS

| | | | |
|---|---|---|---|
| 8,179,456 B2 | 5/2012 | Kim et al. | |
| 10,070,083 B2 | 9/2018 | Konstantatos et al. | |
| 2018/0019363 A1 | 1/2018 | Takahashi et al. | |
| 2019/0349555 A1* | 11/2019 | Lee | H10F 39/805 |
| 2020/0409459 A1 | 12/2020 | Nishide et al. | |
| 2021/0066384 A1 | 3/2021 | Greco et al. | |

FOREIGN PATENT DOCUMENTS

| | | |
|---|---|---|
| CN | 110277418 | 9/2019 |
| JP | 2021010158 | 1/2021 |
| KR | 1020100068992 | 6/2010 |
| KR | 101411548 | 7/2014 |
| KR | 101842784 | 3/2018 |
| KR | 20180106851 A | 10/2018 |
| KR | 101941482 | 1/2019 |
| WO | WO-2021187283 A1 * | 9/2021 |

OTHER PUBLICATIONS

Mohammad Ismail Hossain, et al., "Perovskite Color Detectors: Approaching the Efficiency Limit", ACS Appl. Mater. Interfaces, (2020), vol. 12, pp. 47831-47839.
Korean Office Action, Application No. 10-2021-0098498, mailed Jun. 2, 2025; 8 pages; English Translation.

* cited by examiner

*Primary Examiner* — Samuel A Gebremariam
(74) *Attorney, Agent, or Firm* — CANTOR COLBURN LLP

(57) ABSTRACT

An image sensor includes a plurality of pixels including a blue pixel, a green pixel, and a red pixel. At least a portion of the plurality of pixels includes a first photo-sensing device including a first perovskite which absorbs at least a portion of light in a visible light wavelength spectrum, and a second photo-sensing device which is stacked with the first photo-sensing device and senses at least a portion of light in an infrared wavelength spectrum.

28 Claims, 11 Drawing Sheets

FIG. 4
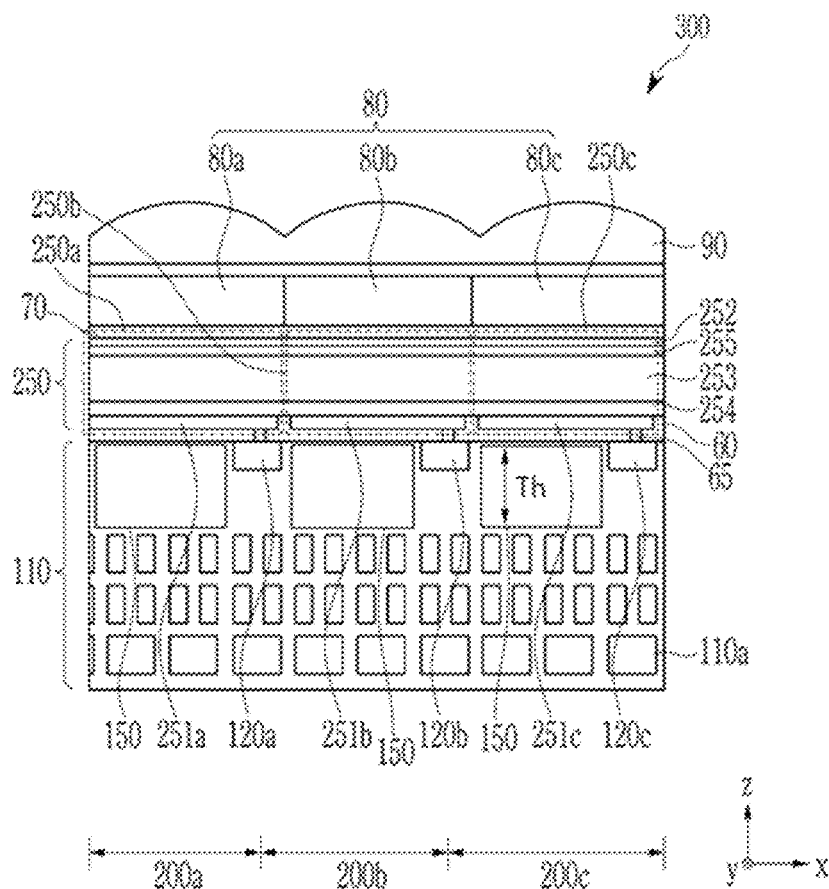
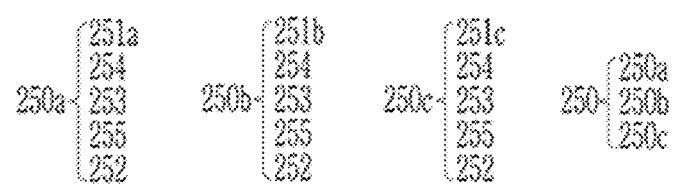

IMAGE SENSOR AND CAMERA AND ELECTRONIC DEVICE

This application claims priority to Korean Patent Application No. 10-2021-0098498, filed on Jul. 27, 2021, and all the benefits accruing therefrom under 35 U.S.C. § 119, the content of which in its entirety is herein incorporated by reference.

BACKGROUND

1. Field

An image sensor, a camera, and an electronic device are disclosed.

2. Description of the Related Art

An imaging device such as a camera includes an imaging device that captures an image and stores the captured image as an electrical signal. The imaging device includes an image sensor that decomposes incident light according to a wavelength to convert each component into an electrical signal.

SUMMARY

Some embodiments provide an image sensor capable of improving optical and electrical performances while widening process selectivity.

Some embodiments provide a camera including the image sensor.

Some embodiments provide an electronic device including the image sensor or the camera.

In an embodiment of the invention, an image sensor includes a plurality of pixels including a blue pixel, a green pixel, and a red pixel. At least a portion of the plurality of pixels includes a first photo-sensing device including a first perovskite which absorbs at least a portion of light in a visible light wavelength spectrum, and a second photo-sensing device stacked with the first photo-sensing device and sensing at least a portion of light in an infrared wavelength spectrum.

In an embodiment, the image sensor may include a substrate on which the plurality of pixels is disposed, the first photo-sensing device may include a blue photo-sensing device included in the blue pixel, a green photo-sensing device included in the green pixel, and a red photo-sensing device included in the red pixel, and the blue photo-sensing device, and the green photo-sensing device, and the red photo-sensing device may be arranged in a first direction parallel to a surface of the substrate or a second direction perpendicular to the surface of a substrate.

In an embodiment, the blue photo-sensing device, the green photo-sensing device, and the red photo-sensing device may be arranged in the first direction with respect to the surface of the substrate, and the image sensor may further include a wavelength selective filter layer including a first color filter on the blue photo-sensing device, a second color filter on the green photo-sensing device, and a third color filter on the red photo-sensing device.

In an embodiment, the first, second, and third color filters may be different from each other, the first color filter may be a blue filter, a cyan filter, or a magenta filter, the second color filter may be a green filter, a cyan filter, or a yellow filter, and the third color filter may be a red filter, a yellow filter, or a magenta filter.

In an embodiment, a cutoff wavelength of the absorption spectrum of the first perovskite may be greater than about 650 nanometers (nm) and less than about 750 nm.

In an embodiment, the blue photo-sensing device, the green photo-sensing device, and the red photo-sensing device may be stacked in a direction perpendicular to the surface of the substrate, where the first perovskite may include a blue perovskite having a cutoff wavelength of an absorption spectrum at a boundary between a blue wavelength spectrum and a green wavelength spectrum, a green perovskite having a cutoff wavelength of an absorption spectrum at a boundary between a green wavelength spectrum and a red wavelength spectrum, and a red perovskite having a cutoff wavelength of an absorption spectrum at a boundary between a red wavelength spectrum and an infrared wavelength spectrum.

In an embodiment, the cutoff wavelength of the absorption spectrum of the blue perovskite may belong to greater than or equal to about 450 nm and less than about 550 nm, the cutoff wavelength of the absorption spectrum of the green perovskite may belong to about 550 nm to about 650 nm, and the cutoff wavelength of the absorption spectrum of the red perovskite may belong to greater than about 650 nm and less than or equal to 750 nm.

In an embodiment, the second photo-sensing device may be integrated in the substrate or disposed on the substrate.

In an embodiment, the second photo-sensing device may be a silicon photo-sensing device.

In an embodiment, a thickness of the second photo-sensing device may be about 1 micrometer (μm) to about 10 μm.

In an embodiment, the second photo-sensing device may include a second perovskite different from the first perovskite, and a cutoff wavelength of an absorption spectrum of the second perovskite may range from about 800 nm to about 3000 nm.

In an embodiment, a thickness of the second photo-sensing device may be greater than or equal to about 100 nm and less than about 1 μm.

In an embodiment, the first photo-sensing device may include a first electrode and a second electrode, and a first photoelectric conversion layer between the first electrode and the second electrode and including the first perovskite.

In an embodiment, the first photo-sensing device may further include a charge auxiliary layer disposed at at least one of between the first electrode and the first photoelectric conversion layer and between the second electrode and the first photoelectric conversion layer.

In an embodiment, the second photo-sensing device may include a third electrode and a fourth electrode, and a second photoelectric conversion layer between the third electrode and the fourth electrode and including a second perovskite, the second perovskite having a cutoff wavelength of an absorption spectrum belonging to about 800 nm to about 3000 nm.

In an embodiment, the second photo-sensing device may further include a charge auxiliary layer disposed at at least one of between the third electrode and the second photoelectric conversion layer and between the fourth electrode and the second photoelectric conversion layer.

In an embodiment, the image sensor may further include a focusing lens on the first photo-sensing device, and a complementary metal-oxide semiconductor ("CMOS") circuit unit under the second photo-sensing device.

In an embodiment of the invention, an image sensor includes a CMOS substrate, a first photo-sensing device on the CMOS substrate, and a wavelength selective filter layer on the first photo-sensing device and including a plurality of color filters selected from a blue filter, a green filter, a red filter, a cyan filter, a yellow filter, and a magenta filter. The first photo-sensing device includes a first electrode and a second electrode, and a photoelectric conversion layer between the first electrode and the second electrode and including a first perovskite having a cutoff wavelength of an absorption spectrum of about 700 nm to about 3000 nm.

In an embodiment, the wavelength selective filter layer may further include an infrared filter.

In an embodiment, the CMOS substrate may not include a silicon photo-sensing device.

In an embodiment, the image sensor may further include a second photo-sensing device which is stacked with the first photo-sensing device and senses light in a longer wavelength spectrum than that of the first photo-sensing device.

In an embodiment, the second photo-sensing device may be integrated in the CMOS substrate or disposed on the CMOS substrate.

In an embodiment, the second photo-sensing device may be a silicon photo-sensing device or may include a second perovskite having a cutoff wavelength longer than the cutoff wavelength of the absorption spectrum of the first perovskite.

In an embodiment, the second photo-sensing device may include a third electrode and a fourth electrode on the substrate, and a photoelectric conversion layer between the third electrode and the fourth electrode and including a second perovskite having a cutoff wavelength that is longer than the cutoff wavelength of the absorption spectrum of the first perovskite and belongs to about 800 nm to about 3000 nm.

In some embodiments, a camera including the image sensor is provided.

In some embodiments, an electronic device including the image sensor or the camera is provided.

An image sensor capable of improving the optical and electrical performance while widening the process selectivity may be realized.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 4 is a cross-sectional view showing an embodiment of the image sensor of FIGS. 1 and 2.

DETAILED DESCRIPTION

Figure 1:
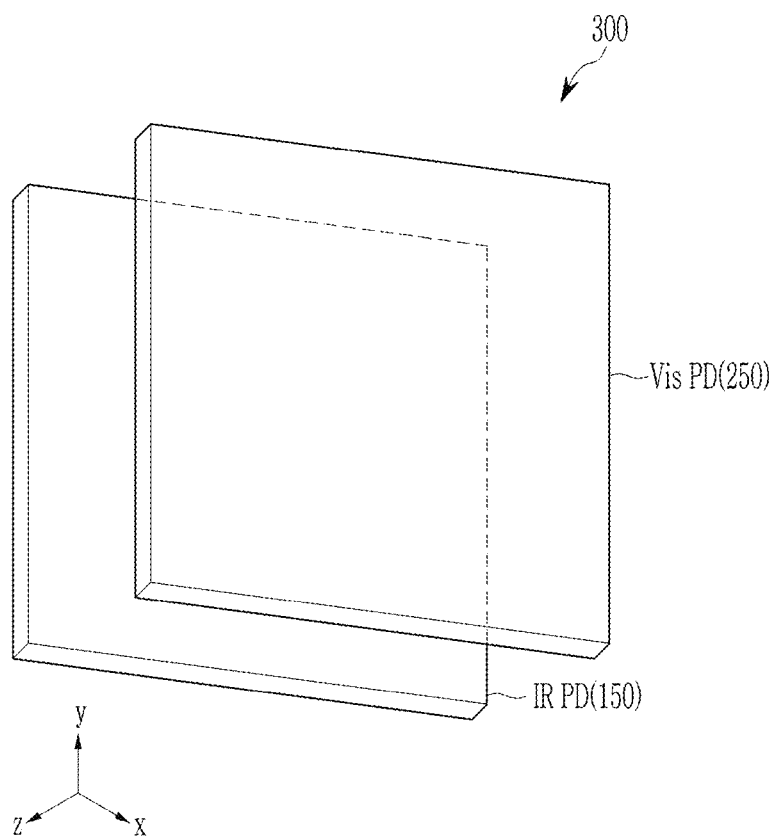
FIG. 1 is a perspective view showing an embodiment of an image sensor.

Hereinafter, embodiments are described in detail so that those skilled in the art can easily implement them. However, the actual applied structure may be implemented in various different forms and is not limited to the embodiments described herein.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present.

In the drawings, parts having no relationship with the description are omitted for clarity, and the same or similar constituent elements are indicated by the same reference numeral throughout the specification.

Hereinafter, the terms "lower portion" and "upper portion" are for convenience of description and do not limit the positional relationship.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Hereinafter, the upper portion of the image sensor is described as a light-receiving side, but this is for convenience of description and does not limit the positional relationship.

Hereinafter, "combination" refers to a combination or a stacked structure of two or more.

Hereinafter, an image sensor in an embodiment is described.

Figure 2:
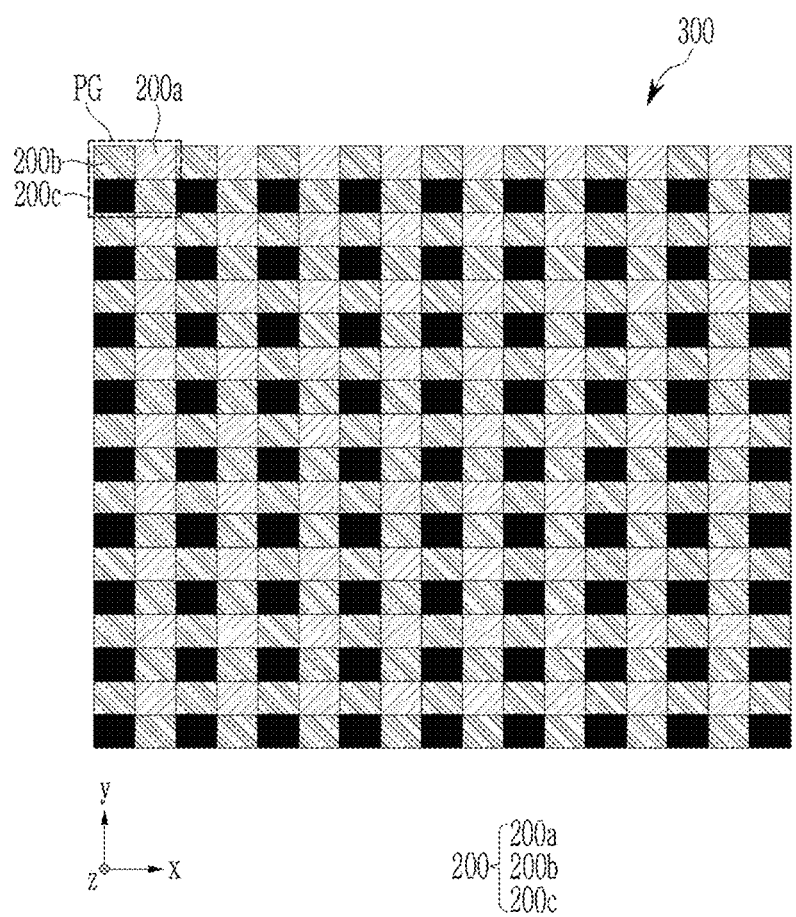
FIG. 2 is a plan view showing an embodiment of pixels of the image sensor of FIG. 1.
Figure 3:
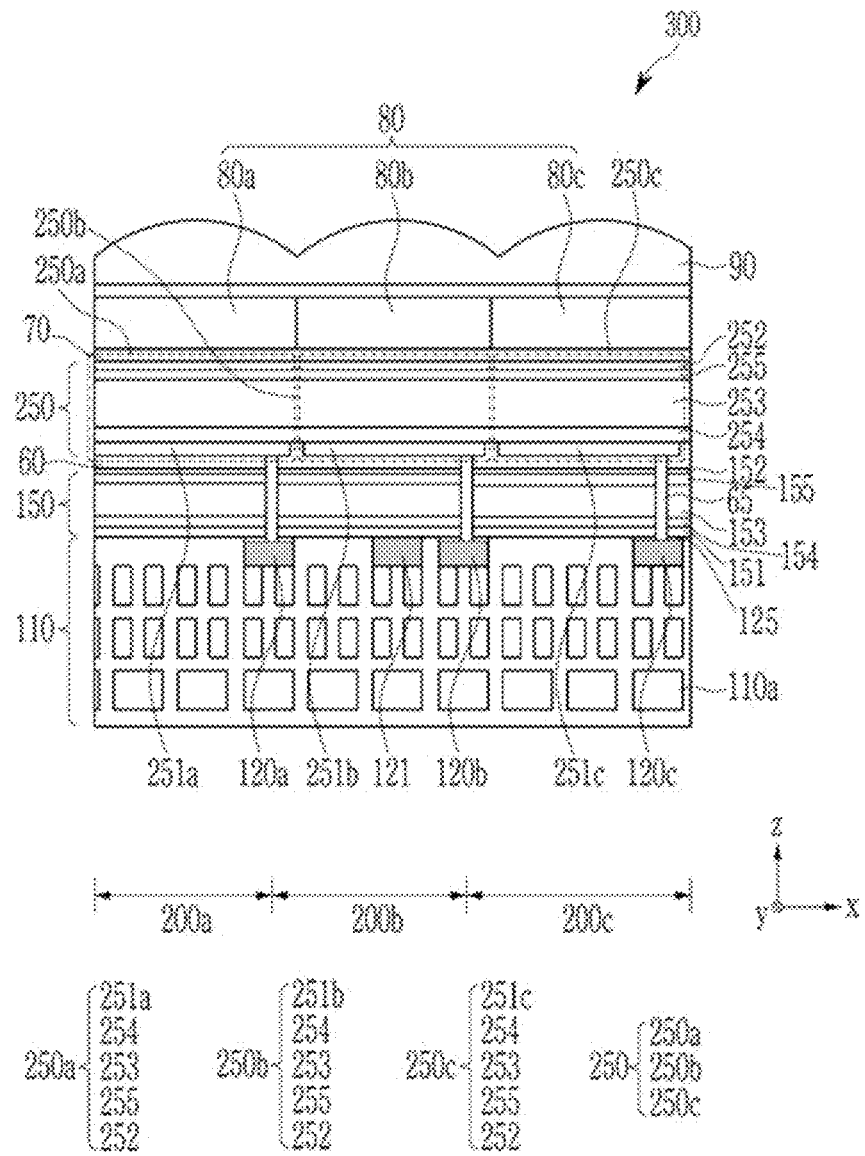
FIG. 3 is a cross-sectional view showing an embodiment of the image sensor of FIGS. 1 and 2.

FIG. 1 is a perspective view showing an embodiment of an image sensor, FIG. 2 is a plan view showing an embodiment of pixels of the image sensor of FIG. 1, and FIG. 3 is a cross-sectional view showing an embodiment of the image sensor of FIGS. 1 and 2.

Referring to FIG. 1, an embodiment of an image sensor 300 includes a visible light sensor Vis PD and an infrared light sensor IR PD. The visible light sensor Vis PD may be on the infrared light sensor IR PD, and the visible light sensor Vis PD may be closer to a side to which light is incident than the infrared light sensor IR PD is. Accordingly, incident light may pass through the visible light sensor Vis PD and may be introduced into the infrared light sensor IR PD. The visible light sensor Vis PD and the infrared light sensor IR PD are stacked along the incident direction of the light. The visible light sensor Vis PD and the infrared light sensor IR PD may selectively sense light of different wavelength spectrums. The visible light sensor Vis PD may include a first photo-sensing device 250 which senses light of a visible light wavelength spectrum and the infrared light sensor IR PD may include a second photo-sensing device 150 which senses light of an infrared wavelength spectrum.

Referring to FIG. 2, the image sensor 300 includes a plurality of pixels 200 for absorbing light of different first, second, and third wavelength spectrums belonging to a visible light wavelength spectrum and performing photoelectric conversion. The plurality of pixels 200 may include a blue pixel 200a for selectively sensing light of a blue wavelength spectrum, a green pixel 200b for selectively sensing light of a green wavelength spectrum, or a red pixel 200c for selectively sensing light of a red wavelength spectrum, and each pixel 200 may be a blue pixel 200a, a green pixel 200b, or a red pixel 200c. The image sensor 300 may obtain a predetermined image by combining electrical signals obtained from the blue pixel 200a, the green pixel 200b, and the red pixel 200c. At least one blue pixel 200a, at least one green pixel 200b, and at least one red pixel 200c may form one pixel group PG and may be repeatedly arranged along rows and/or columns. In an embodiment, each pixel group PG may include one blue pixel 200a, two green pixels 200b, and one red pixel 200c, for example, but is not limited thereto.

Referring to FIG. 2 together with FIG. 1, at least some of the plurality of pixels 200 may include a first photo-sensing device 250 which senses at least a portion of light in a visible light wavelength spectrum and a second photo-sensing device 150 which senses light in an infrared wavelength spectrum, and the first photo-sensing device 250 and the second photo-sensing device 150 are stacked along the incident direction of light. Specifically, each of the blue pixel 200a, the green pixel 200b, and the red pixel 200c is stacked along the incident direction of the light and includes a first photo-sensing device 250 which senses light of a blue, green, or red wavelength spectrum and a second photo-sensing device 150 which senses light of an infrared wavelength spectrum.

Referring to FIG. 3, the image sensor 300 includes a substrate 110, a first photo-sensing device 250, a wavelength selective filter layer 80, a second photo-sensing device 150, and insulating layers 60 and 70, and a focusing lens 90.

The substrate 110 may be a semiconductor substrate, e.g., a silicon substrate. In an embodiment, The substrate 110 may be a complementary metal-oxide semiconductor ("CMOS") substrate and may include a CMOS circuit unit 110a, for example. The substrate 110 may include charge storages 120a, 120b, 120c, and 121 and a transmission transistor (not shown). The charge storages 120a, 120b, 120c, and 121 are electrically connected to the first photo-sensing device 250 or the second photo-sensing device 150 to be described later, and the charge storages 120a, 120b, and 120c and the surface of the substrate 110 may be separated by an insulating layer 125. A metal wire (not shown) and a pad (not shown) may be formed or disposed on or under the substrate 110.

The first photo-sensing device 250 may be a photoelectric conversion diode electrically isolated for each pixel 200a, 200b, and 200c, and includes the blue photo-sensing device 250a included in the blue pixel 200a, the green photo-sensing device 250b included in the green pixel 200b, and the red photo-sensing device 250c included in the red pixel 200c. The blue photo-sensing device 250a, the green photo-sensing device 250b, and the red photo-sensing device 250c are arranged in a horizontal direction (e.g., xy direction) parallel to the surface of the substrate 110 to form a visible photo-sensing device array and the visible photo-sensing device array may be the visible light sensor Vis PD of FIG. 1.

The blue photo-sensing device 250a, the green photo-sensing device 250b, and the red photo-sensing device 250c include the lower electrodes 251a, 251b, and 251c, the upper electrode 252, and a photoelectric conversion layer 253 between the lower electrodes 251a, 251b, and 251c and the upper electrode 252, and the charge auxiliary layers 254 and 255, respectively.

One of the lower electrodes 251a, 251b, and 251c or the upper electrode 252 is an anode and the other is a cathode. In an embodiment, the lower electrodes 251a, 251b, and 251c may be anodes and the upper electrode 252 may be a cathode, for example. In an embodiment, the lower electrodes 251a, 251b, and 251c may be cathodes and the upper electrodes 252 may be an anode, for example.

At least one of the lower electrodes 251a, 251b, and 251c or the upper electrode 252 may be a light-transmitting electrode, and the lower electrodes 251a, 251b, and 251c and the upper electrode 252 may each be a light-transmitting electrode, for example. The light-transmitting electrode may be a transparent electrode or a semi-transmissive electrode. In an embodiment, the transparent electrode may have a transmittance of greater than or equal to about 80%, greater than or equal to about 85%, greater than or equal to about 88%, greater than or equal to about 90%, or greater than or equal to about 95%, for example, and the semi-transmissive electrode may have a transmittance of about 10% to about 70%, about 20% to about 60%, or about 30% to about 50%, for example. In an embodiment, the transparent electrode or the semi-transmissive electrode may include at least one of an oxide conductor, a carbon conductor, or a metal thin film, for example. In an embodiment, the oxide conductor may include one or more selected from indium tin oxide ("ITO"), indium zinc oxide ("IZO"), zinc tin oxide ("ZTO"), aluminum tin oxide ("ATO") and aluminum zinc oxide ("AZO"), the carbon conductor may include one or more selected from graphene and carbon nanostructures, and the metal thin film may be a thin film including aluminum Al, magnesium Mg, silver Ag, gold Au, an alloy thereof, or any combinations thereof, for example.

The lower electrodes 251a, 251b, and 251c may be pixel electrodes separated for each blue pixel 200a, green pixel 200b, and red pixel 200c, and the upper electrode 252 may be a common electrode. In an embodiment, the lower electrodes 251a, 251b, and 251c may be electrically connected to the charge storages 120a, 120b, and 120c integrated in the substrate 110 through a trench 65, respectively, and the trench 65 may be filled with conductive fillers, for example.

The upper electrode 252 may be an incident electrode disposed in a direction in which light is incident.

The photoelectric conversion layer 253 may include perovskite, and may convert light absorbed by the perovskite into an electrical signal.

In an embodiment, the perovskite may be an inorganic or organic-inorganic light absorbing material having a predetermined crystal structure, and may have a crystal structure represented by $ABX_3$, $A_2BX_4$, $A_3BX_5$, $A_4BX_6$, $ABX_4$, $A_{n-1}B_nX_{3n+1}$, or $L_2A_{n-1}B_nX_{3n+1}$ (n=2 to 6), for example, but is not limited thereto. Herein, A may be a monovalent metal cation belonging to Group IA (Li, Na, K, Rb, Cs, or Fr); a monovalent organic cation such as organic ammonium cations and an organic amino cation; or any combinations thereof, B may be a metal cation belonging to Groups IVA, IIA, IIIA or VA ($Pb^{2+}$, $Sn^{2+}$, $Ge^{2+}$, $Ga^{2+}$, $Sr^{2+}$, $Ba^{2+}$, $Ga^{2+}$, $In^{2+}$, $Al^{2+}$, $As^{2+}$, $Sb^{2+}$, $Bi^{2+}$, and $Po^{2+}$), X may be an oxygen ion or a halide anion such as $F^-$, $C^-$, $Br^-$, or $I^-$, and L may be an aliphatic or aromatic ammonium cation or an aliphatic or aromatic amino cation different from A, for example. In an embodiment, the organic ammonium cation or the organic amino cation may be methylammonium, formamidinium, or phenylammonium, for example, but is not limited thereto. The aliphatic or aromatic ammonium cation or the aliphatic or aromatic amino cation may be n-butyl ammonium, 2-phenylmethylammonium, or 2-phenylethylammonium, for example, but is not limited thereto.

In an embodiment, at least one of the perovskite (hereinafter referred to as "first perovskite") included in the photoelectric conversion layer 253 may be halide perovskite including halide anions, for example. In an embodiment, the first perovskite may be an organic-inorganic hybrid perovskite including an organic cation and a metal cation, for example. In an embodiment, the first perovskite may be $CsPbBrI_2$, $CsPbBr_2I$, $CsPbCl_3$, $CsPbBr_3$, $CsPbI_3$, $CH_3NH_3PbCl_3$, $CH_3NH_3PbBr_3$, $CH_3NH_3PbI_3$, $CH_3Pb(I_xBr_y)_3$ ($0<x<1$, $0<y<1$, and $x+y=1$), $CH_3NH_3Pb(I_xCl_y)_3$ ($0<x<1$, $0<y<1$, $x+y=1$), $CH_3NH_3Pb(Br_xCl_y)_3$ ($0<x<1$, $0<y<1$, and $x+y=1$), $CH_3NH_3Sn_{1-x}Pb_xBr_3$, $CH_3NH_3Sn_{1-x}Pb_xI_3$, $HC(NH_2)_2PbI_3$, $(C_4H_9NH_3)_2PbBr_4$, $(CH_5CH_2NH_3)_2PbBr_4$, $(CH_5CH_2NH_3)_2PbI_4$, $(C_6H_5C_2H_4NH_3)_2PbBr_4$, or $(C_6H_{13}NH_3)_2(CH_3NH_3)_nPb_nI_{3n+1}$, for example, but is not limited thereto.

The first perovskite may absorb light of at least a portion of the visible light wavelength spectrum, e.g., light of the full visible light wavelength spectrum. Herein, the visible light wavelength spectrum may be greater than or equal to about 380 nanometers (nm) and less than about 750 nm, within the above range, about 380 nm to about 730 nm, about 380 nm to about 720 nm, about 380 nm to about 710 nm, about 380 nm to about 700 nm, about 380 nm to about 680 nm, about 380 nm to about 650 nm, greater than or equal to about 400 nm and less than about 750 nm, about 400 nm to about 730 nm, about 400 nm to about 720 nm, about 400 nm to about 710 nm, about 400 nm to about 700 nm, about 400 nm to about 680 nm, or about 400 nm to about 650 nm, for example.

In an embodiment, the absorption spectrum of the first perovskite may have a relatively high absorbance over the full wavelength spectrum of visible light from a short wavelength (e.g., a wavelength belonging to an X-ray or UV-ray region), for example. The absorption characteristics of perovskite may be represented by the cutoff wavelength of the absorption spectrum, and the cutoff wavelength of the absorption spectrum may be an end of the absorption spectrum, that is, the long-wavelength end-point of the wavelength spectrum that the perovskite may absorb. The cutoff wavelength of the absorption spectrum of the perovskite may be determined by an energy bandgap of the perovskite, and the first perovskite may have an energy bandgap that matches the visible light wavelength spectrum. In an embodiment, the energy bandgap of the first perovskite may be about 1.8 electron volts (eV) to about 4.1 eV, within the above range, about 1.9 eV to about 4.0 eV, or about 2.0 eV to about 3.9 eV, for example.

In an embodiment, the absorption spectrum of the first perovskite may include all of the visible light wavelength spectrum, the cutoff wavelength of the first perovskite may exist at the end-point of the visible light wavelength spectrum or at a longer wavelength point, and may belong to a wavelength spectrum of about 700 nm to about 3000 nm, for example.

In an embodiment, the cutoff wavelength of the absorption spectrum of the first perovskite may be a boundary point between the visible light wavelength spectrum and the infrared wavelength spectrum, and may be greater than about 650 nm and less than about 750 nm, within the above range, about 670 nm to about 730 nm, about 680 nm to about 720 nm, or about 690 nm to about 710 nm, for example.

The photoelectric conversion layer 253 may include one or two or more types of first perovskite in order to have such a light absorption characteristic, and may be selected from the aforementioned perovskites.

As described above, the perovskite may have wavelength selectivity because the cutoff wavelength of the absorption spectrum may be determined according to the energy bandgap. Accordingly, unlike silicon which absorbs light of a broader wavelength spectrum from a short wavelength (around 200 nm) to an infrared wavelength spectrum without wavelength selectivity, even without a separate infrared blocking filter, the photoelectric conversion layer 253 including the first perovskite may exclude light of the infrared wavelength spectrum and absorb light of the visible light wavelength spectrum.

In addition, since the perovskite may have an absorbance of about 10 times or more (e.g., about 10 times to about 1000 times) compared to that of silicon, it may have a higher absorption characteristic than that of a conventional silicon photodiode. In an embodiment, in order to have the same absorbance, the thickness of the photoelectric conversion layer 253 including the first perovskite may be reduced to about 1/10 or less than the thickness of the conventional silicon photodiode, for example, and thus the thickness of the image sensor 300 may be greatly reduced. The photoelectric conversion layer 253 including the first perovskite may have a relatively thin thickness due to such high absorbance, and may have a thickness, e.g., about 100 nm to about 800 nm, about 100 nm to about 700 nm, about 100 nm to about 500 nm, or about 300 nm to about 500 nm.

In addition, the photoelectric conversion layer 253 including the first perovskite may have a refractive index of less than or equal to about 3.0 (e.g., the refractive index of $CH_3NH_3PbI_3$: about 2.84 @ 633 nm), which may be lower than the refractive index of silicon (about 3.88 @ 630 nm). Accordingly, the interfacial reflectance of the air and the photoelectric conversion layer 253 with respect to the incident angle of 0 degrees is less than about 30%, less than or equal to about 28%, less than or equal to about 25% (e.g., about 23%), while the interfacial reflectance of air and silicon is about 35%. Thus, by the photoelectric conversion layer 253 including the first perovskite instead of silicon, more light may be condensed into the photoelectric conversion layer 253 or a separate anti-reflection film may not be formed or provided.

In addition, since the perovskite has a charge mobility of about 1000 times or more (e.g., about 1000 times to about $10^6$ times) higher than that of the organic photoelectric conversion material, it may have high photoelectric conversion efficiency and low remaining charges in addition to the aforementioned high light absorption characteristics. Accordingly, it may be effectively applied to high-performance image sensors such as high-speed driving sensors.

In addition, the perovskite may be applied to both solution processes such as spin coating, slit coating, and inkjet coating, or deposition processes such as vacuum deposition and thermal deposition, and thus it may have less process limitation.

The wavelength selective filter layer 80 is formed or disposed on the blue photo-sensing device 250a, the green photo-sensing device 250b, and the red photo-sensing device 250c. The wavelength selective filter layer 80 may selectively transmit light of a predetermined wavelength spectrum among incident visible light wavelength spectrum light, and may absorb and/or reflect light of the remaining wavelength spectrum except for a predetermined wavelength spectrum among the visible light wavelength spectrum. The wavelength selective filter layer 80 may provide wavelength selectivity of the light to be photoelectrically converted, to the blue photo-sensing device 250a, the green photo-sensing device 250b, and the red photo-sensing device 250c disposed thereunder.

The wavelength selective filter layer 80 includes a first color filter 80a included in the blue pixel 200a, a second color filter 80b included in the green pixel 200b, and a third color filter 80c included in the red pixel 200c. The first color filter 80a may be overlapped with the blue photo-sensing device 250a in the blue pixel 200a and may be disposed on the blue photo-sensing device 250a. The second color filter 80b may be overlapped with the green photo-sensing device 250b in the green pixel 200b and may be disposed on the green photo-sensing device 250b. The third color filter 80c may be overlapped with the red photo-sensing device 250c in the red pixel 200c and may be disposed on the red photo-sensing device 250c. In an embodiment, the first color filter 80a, the second color filter 80b, and the third color filter 80c may be different from each other and may be selected from a blue filter, a green filter, a red filter, a cyan filter, a yellow filter, and a magenta filter, for example.

In an embodiment, the first color filter 80a may selectively transmit light of a predetermined wavelength spectrum including a blue wavelength spectrum among the visible light wavelength spectrum, and may be a blue filter, a cyan filter, or a magenta filter, for example.

In an embodiment, the second color filter 80b may selectively transmit light of a predetermined wavelength spectrum including a green wavelength spectrum among the visible light wavelength spectrum, and may be a green filter, a cyan filter, or a yellow filter, for example.

In an embodiment, the third color filter 80c may selectively transmit light of a predetermined wavelength spectrum including a red wavelength spectrum among the visible light wavelength spectrum, and may be a red filter, a yellow filter, or a magenta filter, for example.

In an embodiment, the first, second, and third color filters 80a, 80b, and 80c may be a blue filter, a green filter, and a red filter, respectively, for example. In an embodiment, the first, second, and third color filters 80a, 80b, and 80c may be a cyan filter, a yellow filter, and a magenta filter, respectively, for example.

The photoelectric conversion layer 253 in the blue photo-sensing device 250a, the green photo-sensing device 250b, and the red photo-sensing device 250c may photoelectrically convert light passing through the first, second and third color filters 80a, 80b, and 80c. In an embodiment, the photoelectric conversion layer 253a included in the blue photo-sensing device 250a may photoelectrically convert light having a blue wavelength spectrum (or light including a blue wavelength spectrum) passing through the first color filter 80a, the photoelectric conversion layer 253b included in the green photo-sensing device 250b may photoelectrically convert light having a green wavelength spectrum (or light including a green wavelength spectrum) passing through the second color filter 80b, and the photoelectric conversion layer 253c included in the red photo-sensing device 250c may photoelectrically convert light having a red wavelength spectrum (or light including a red wavelength spectrum) passing through the third color filter 80c, for example.

Charge carriers (holes or electrons) generated by photoelectric conversion in the photoelectric conversion layer 253 in the blue photo-sensing device 250a, the green photo-sensing device 250b, and the red photo-sensing device 250c may move into the lower electrodes 251a, 251b, and 251c, respectively, and the upper electrode 252, and the charge carriers moved into the lower electrodes 251a, 251b, and 251c may be collected in the charge storages 120a, 120b, and 120c.

The charge auxiliary layers 254 and 255 may be respectively between the lower electrodes 251a, 251b, and 251c and the photoelectric conversion layer 253 and between the upper electrode 252 and the photoelectric conversion layer 253, and may improve electrical characteristics between the lower electrodes 251a, 251b, and 251c and the photoelectric conversion layer 253 and between the upper electrode 252 and the photoelectric conversion layer 253, and the photoelectric conversion efficiency may be increased or the dark current and/or remaining charge carriers may be lowered, for example. In an embodiment, the charge auxiliary layers 254 and 255 may be a hole transport layer, a hole injection layer, an electron blocking layer, an electron transport layer, an electron injection layer, a hole blocking layer, or any combinations thereof, for example. In an alternative embodiment, at least one of the charge auxiliary layers 254 and 255 may be omitted.

The second photo-sensing device 150 may be on the whole surface of the substrate 110 and is stacked with the first photo-sensing device 250 in each of the pixels 200a, 200b, and 200c. The second photo-sensing device 150 may be included in the infrared light sensor IR PD of FIG. 1.

The second photo-sensing device 150 may sense light having a longer wavelength than that of the first photo-sensing device 250, that is, light of at least a portion of the infrared wavelength spectrum. In an embodiment, the second photo-sensing device 150 may be a photoelectric conversion diode, for example, and may include the lower electrode 151, the upper electrode 152, and the photoelectric conversion layer 153 between the lower electrode 151 and the upper electrode 152, and charge auxiliary layers 154 and 155 between the lower electrode 151 and the photoelectric conversion layer 153 and between the upper electrode 152 and the photoelectric conversion layer 153.

One of the lower electrode 151 or the upper electrode 152 may be an anode and the other may be a cathode. In an embodiment, the lower electrode 151 may be an anode and the upper electrode 152 may be a cathode, for example. In an embodiment, the lower electrode 151 may be a cathode and the upper electrode 152 may be an anode, for example. In an embodiment, the lower electrode 151 may be a light-transmitting electrode or a reflective electrode, for example. In an embodiment, the upper electrode 152 may be a light-transmitting electrode, for example, and the description of the light-transmitting electrode is as described above. The lower electrode 151 may be electrically connected to the charge storage 121 integrated in the substrate 110, and the upper electrode 152 may be an incident electrode disposed in a direction in which the light passing through the wavelength selective filter layer 80 and the first photo-sensing device 250.

The photoelectric conversion layer 153 may include a perovskite (hereinafter referred to as "second perovskite") different from the first perovskite included in the aforementioned photoelectric conversion layer 253.

The second perovskite may absorb light of at least a portion of the infrared wavelength spectrum. In an embodiment, the infrared wavelength spectrum may include some or all of the near-infrared, short-wave infrared, mid-wave infrared, and far-infrared wavelength spectrum, and may be greater than about 700 nm and less than or equal to about 3000 nm, within the above range, greater than about 700 nm and less than or equal to about 2500 nm, greater than about 700 nm and less than or equal to about 2000 nm, greater than about 700 nm and less than or equal to about 1800 nm, greater than about 700 nm and less than or equal to about 1500 nm, about 750 nm to about 3000 nm, about 750 nm to about 2500 nm, about 750 nm to about 2000 nm, about 750 nm to about 1800 nm, about 750 nm to about 1500 nm, about 800 nm to about 3000 nm, about 800 nm to about 2500 nm, about 800 nm to about 2000 nm, about 800 nm to about 1800 nm, or about 800 nm to about 1500 nm, for example, but is not limited thereto.

In an embodiment, the absorption spectrum of the second perovskite may have a relatively high absorbance from a short wavelength (e.g., a wavelength belonging to an X-ray or UV-ray region) to an infrared wavelength spectrum, for example. The second perovskite may have an energy bandgap that matches the infrared wavelength spectrum.

In an embodiment, the cutoff wavelength of the absorption spectrum of the second perovskite may be the end-point of the infrared wavelength spectrum to be photoelectrically converted, and may be a longer wavelength than the cutoff wavelength of the absorption spectrum of the aforementioned first perovskite, for example. In an embodiment, the cutoff wavelength of the absorption spectrum of the second perovskite may belong to about 800 nm to about 3000 nm, within the above range, about 800 nm to about 2500 nm, about 800 nm to about 2200 nm, about 800 nm to about 2000 nm, about 800 nm to about 1800 nm, about 800 nm to about 1500 nm, about 800 nm to about 1300 nm, about 900 nm to about 2500 nm, about 900 nm to about 2200 nm, about 900 nm to about 2000 nm, about 900 nm to about 1800 nm, about 900 nm to about 1500 nm, about 900 nm to about 1300 nm, about 1000 nm to about 2500 nm, about 1000 nm to about 2200 nm, about 1000 nm to about 2000 nm, about 1000 nm to about 1800 nm, about 1000 nm to about 1500 nm, or about 1000 nm to about 1300 nm, for example.

In an embodiment, the second perovskite may include, but is not limited to, $CsSnI_3$, $CsSnBr_3$, $CsSnCl_3$, $CH_3NH_3SnBr_3$, $CH_3NH_3SnI_3$, $HC(NH_2)_2SnI_3$, or any combinations thereof, for example.

The charge auxiliary layers 154 and 155 may be respectively between the lower electrode 151 and the photoelectric conversion layer 153 and between the upper electrode 152 and the photoelectric conversion layer 153 and may improve electrical characteristics between the lower electrode 151 and the photoelectric conversion layer 153 and between the upper electrode 152 and the photoelectric conversion layer 153 and the photoelectric conversion efficiency may be increased or the dark current and/or remaining charges may be lowered, for example. In an embodiment, the charge auxiliary layers 154 and 155 may be a hole transport layer, a hole injection layer, an electron blocking layer, an electron transport layer, an electron injection layer, a hole blocking layer, or any combinations thereof, for example. In an alternative embodiment, at least one of the charge auxiliary layers 154 or 155 may be omitted.

Since the second photo-sensing device 150 is disposed under the aforementioned wavelength selective filter layer 80 and the first photo-sensing device 250 and may sense first light that passes through the wavelength selective filter layer 80 and the first photo-sensing device 250, although the absorption spectrum of the second perovskite spans from the short wavelength to the infrared wavelength spectrum, light in the visible light wavelength spectrum may be excluded and light in the infrared wavelength spectrum may be selectively absorbed and photoelectrically converted. In an embodiment, the transmittance of the infrared wavelength spectrum of the first photo-sensing device 250 may be about 80% to about 100%, and within the above range, about 85% to about 100%, about 90% to about 100%, about 95% to about 100%, about 97% to about 100%, about 98% to about 100%, or about 99% to about 100%, for example. Due to the second photo-sensing device 150, the substrate 110 may not include a separate silicon photo-sensing device.

As described above, since the perovskite may have an absorbance of about 10 times or more (e.g., about 10 times to about 1000 times) compared to silicon, it may be formed thinner than the thickness of the conventional silicon photodiode. In an embodiment, the second photo-sensing device 150 may be less than about 1 micrometer (μm) and within the above range, greater than or equal to about 100 nm and less than about 1 μm, greater than or equal to about 200 nm and less than about 1 μm, greater than or equal to about 300 nm and less than about 1 μm, about 100 nm to about 950 nm, about 200 nm to about 950 nm, or about 300 nm to about 950 nm, for example.

Charge carriers (holes or electrons) generated by photoelectric conversion in the photoelectric conversion layer 153 may move into the lower electrode 151 and the upper electrode 152, respectively, and the charge carriers moved into the lower electrode 151 may be collected in the charge storage 121.

The insulating layers 60 and 70 are respectively between the first photo-sensing device 250 and the second photo-sensing device 150 and between the first photo-sensing device 250 and the wavelength selective filter layer 80. The insulating layers 60 and 70 may include an organic material, an inorganic material, an organic-inorganic material, or any combinations thereof, e.g., an inorganic insulating material such as a silicon oxide and/or a silicon nitride or a low dielectric constant (low K) material such as SiC, SiCOH, SiCO, and SiOF. In an alternative embodiment, at least one of the insulating layers 60 or 70 may be omitted.

The focusing lens 90 may be on the first photo-sensing device 250 and wavelength selective filter layer 80 to control the direction of the incident light and collect the light to one point. In an embodiment, the focusing lens 90 may have a cylindrical shape or a hemispherical shape, for example, but is not limited thereto. A planarization layer may be optionally between the focusing lens 90 and the wavelength selective filter layer 80.

As described above, the image sensor 300 in the illustrated embodiment may be a stacked sensor in which a visible light sensor and an infrared light sensor which sense light of different wavelength spectrums each other are stacked. Accordingly, an in-pixel image sensor that realizes an image by simultaneously sensing light in the visible light region and light in the infrared region within one pixel may be implemented. Therefore, unlike the structure in which the visible light sensor and the infrared light sensor are manufactured on separate substrates, sensitivity in a low-light environment may be improved without increasing the size of the image sensor 300, and by widening a dynamic range that separates black and white details, sensing ability of a three-dimensional image may be effectively increased. In addition, the infrared light sensor may be used as a security sensor, a vehicle sensor, or a biometric sensor, and may be used as a combination sensor having combination functions of an image sensor, a security sensor, a vehicle sensor, or a biometric sensor due to the aforementioned stacked structure of the visible light sensor and the infrared light sensor. In an embodiment, the biometric sensor may be an iris sensor, a depth sensor, a fingerprint sensor, or a blood vessel distribution sensor, for example, but is not limited thereto.

Hereinafter, another embodiment of an image sensor is described.

FIG. 4 is a cross-sectional view showing an embodiment of the image sensor of FIGS. 1 and 2.

Referring to FIG. 4, an embodiment of an image sensor 300 includes a substrate 110, a first photo-sensing device 250, a wavelength selective filter layer 80, second photo-sensing device 150 and focusing lens 90, like the aforementioned example. The first photo-sensing device 250 and the second photo-sensing device 150 are stacked. The first photo-sensing device 250 may selectively absorb light of a wavelength spectrum of visible light that passes through the wavelength selective filter layer 80 to photoelectrically convert it and the second photo-sensing device 150 may photoelectrically convert light having an infrared wavelength spectrum that passes through the wavelength selective filter layer 80 and the first photo-sensing device 250.

However, in the embodiment of the image sensor 300 in FIG. 4, unlike the image sensor 300 according to the aforementioned embodiment, the second photo-sensing device 150 is integrated in the substrate 110. The second photo-sensing device 150 may be a silicon photo-sensing device, e.g., a silicon photodiode. The second photo-sensing device 150 may have a depth and a thickness which enable to absorb light of an infrared wavelength spectrum in the substrate 110. In an embodiment, a thickness Th of the second photo-sensing device 150 may be about 1 μm to about 10 μm, within the above range, about 2 μm to about 8 μm, or about 2 μm to about 6 μm, for example.

Hereinafter, another embodiment of an image sensor is described.

Figure 5:
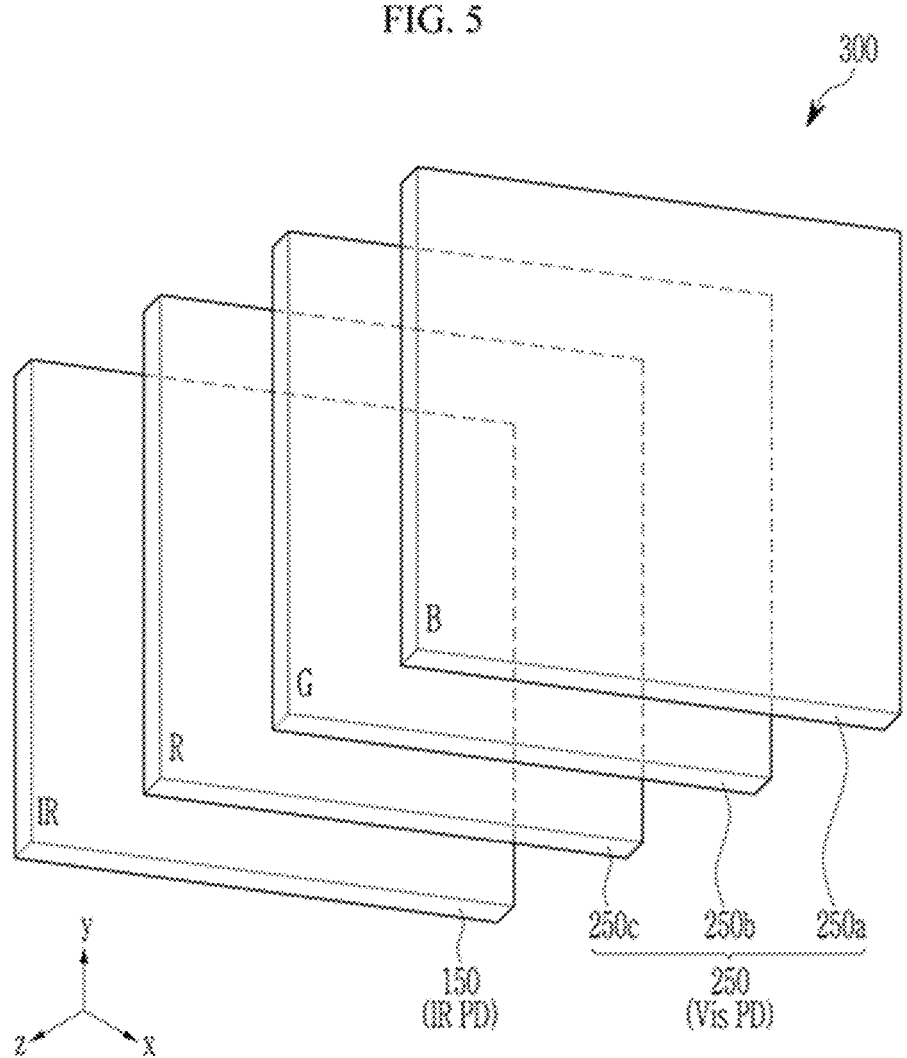
FIG. 5 is a perspective view showing another embodiment of an image sensor.
Figure 6:
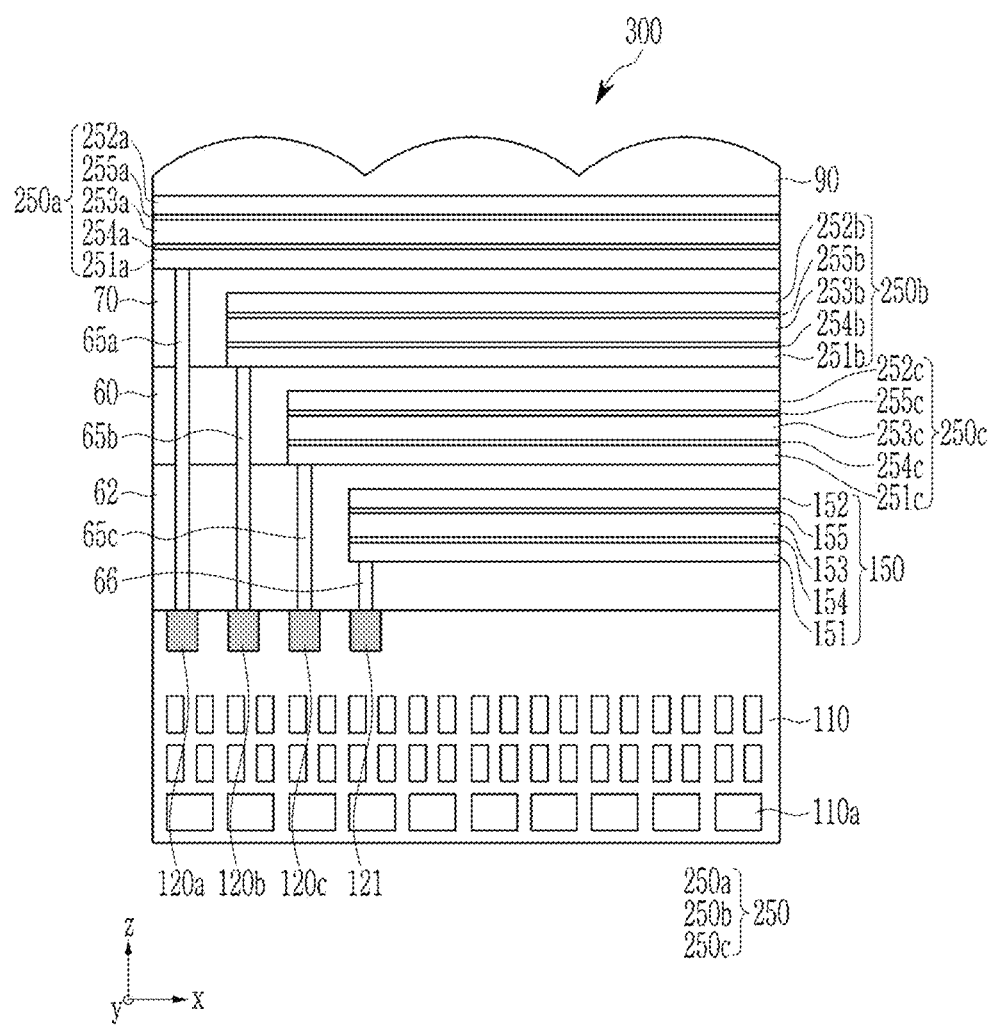
FIG. 6 is a cross-sectional view showing an embodiment of pixels of the image sensor of FIG. 5.

FIG. 5 is a perspective view showing another embodiment of an image sensor, and FIG. 6 is a cross-sectional view showing an embodiment of pixels of the image sensor of FIG. 5.

Referring to FIG. 5, the image sensor 300 in the embodiment is a stacked sensor in which a visible light sensor Vis PD and an infrared light sensor IR PD are stacked like the aforementioned embodiment. However, in an embodiment of the image sensor 300 in FIG. 5, unlike the aforementioned embodiment, a blue photo-sensing device 250a, a green photo-sensing device 250b, and a red photo-sensing device 250c are stacked. That is, the blue photo-sensing device 250a, the green photo-sensing device 250b, the red photo-sensing device 250c included in the first photo-sensing device 250 and the second photo-sensing device 150 may be stacked along an incident direction of the light or in a direction perpendicular to the surface of the substrate 110 (e.g., z direction).

Referring to FIG. 6, the image sensor 300 according to this embodiment includes a substrate 110, a first photo-sensing device 250, a second photo-sensing device 150, and a focusing lens 90.

The substrate 110 may be a semiconductor substrate, e.g., a silicon substrate. In an embodiment, the substrate 110 may be a CMOS substrate and may include a CMOS circuit unit 110a, for example. The substrate 110 may include charge storages 120a, 120b, 120c, and 121 and a transmission transistor (not shown). A metal wire (not shown) and a pad (not shown) may be formed or disposed on the lower portion of the substrate 110.

The first photo-sensing device 250 is closer to the light incident side than the second photo-sensing device 150 is, which is to be described later. The first photo-sensing device 250 includes a blue photo-sensing device 250a, a green photo-sensing device 250b, and a red photo-sensing device 250c which are stacked in a vertical direction (e.g., z direction) with respect to the surface of the substrate 110.

The blue photo-sensing device 250a, the green photo-sensing device 250b, and the red photo-sensing device 250c include lower electrodes 251a, 251b, and 251c, upper electrodes 252a, 252b, and 252c, photoelectric conversion layers 253a, 253b, and 253c between the lower electrodes 251a, 251b, and 251c and the upper electrodes 252a, 252b, and 252c, and charge auxiliary layers 254a, 254b, 254c, 255a, 255b, and 255c between the lower electrodes 251a, 251b, and 251c and the photoelectric conversion layers 253a, 253b, and 253c and between the upper electrodes 252a, 252b, and 252c and the photoelectric conversion layers 253a, 253b, and 253c, respectively.

The lower electrodes 251a, 251b, and 251c and the upper electrodes 252a, 252b, and 252c may be light-transmitting electrodes, respectively, and the descriptions of the lower electrodes 251a, 251b, and 251c and the upper electrodes 252a, 252b, and 252c are as described above. The photoelectric conversion layers 253a, 253b, and 253c may each include the first perovskite as described above, and may convert light absorbed by the first perovskite into an electrical signal.

However, unlike the aforementioned embodiment, the first perovskite included in each of the photoelectric conversion layers 253a, 253b, and 253c may be different from each other. Specifically, the first perovskite included in the photoelectric conversion layer 253a of the blue photo-sensing device 250a may be a blue perovskite, the first perovskite included in the photoelectric conversion layer 253b of the green photo-sensing device 250b may be a green perovskite, and the first perovskite included in the photoelectric conversion layer 253c of the red photo-sensing device 250c may be a red perovskite.

The blue perovskite may have a relatively high absorbance over a blue wavelength spectrum from a short wavelength (e.g., a wavelength belonging to an X-ray or UV-ray region), and a cutoff wavelength of the absorption spectrum of the blue perovskite may be an end-point of the blue wavelength spectrum, e.g., a boundary point between the blue wavelength spectrum and the green wavelength spectrum. In an embodiment, the cutoff wavelength of the absorption spectrum of the blue perovskite may belong to greater than or equal to about 450 nm and less than about 550 nm, and within the range, about 470 nm to 530 nm, about 480 nm to 520 nm, or about 490 nm to 510 nm, for example. The cutoff wavelength of the absorption spectrum of the blue perovskite may be determined by an energy bandgap of the perovskite, and the blue perovskite may have the energy bandgap that matches the blue wavelength spectrum (or the cutoff wavelength, which is the end-point of the blue wavelength spectrum). In an embodiment, the energy bandgap of the blue perovskite may be greater than about 2.2 eV and less than or equal to about 2.7 eV, for example. In an embodiment, the blue perovskite may be $CH_3NH_3PbCl_3$, $CH_3NH_3Pb(Br_{0.6}Cl_{0.4})_3$, or any combinations thereof, for example, but is not limited thereto.

The green perovskite may have relatively high absorbance from the short wavelength (e.g., a wavelength belonging to an X-ray or UV-ray region) over a green wavelength spectrum, and a cutoff wavelength of the absorption spectrum of the green perovskite may be an end-point of the green wavelength spectrum, e.g., a boundary point of the green wavelength spectrum and the red wavelength spectrum. In an embodiment, the cutoff wavelength of the absorption spectrum of the green perovskite may belong to about 550 nm to about 650 nm and within the range, about 570 nm to about 630 nm, about 580 nm to about 620 nm, or about 590 nm to about 610 nm, for example. The cutoff wavelength of the absorption spectrum of the green perovskite may be determined by an energy bandgap of the perovskite, and the green perovskite may have the energy bandgap that matches the green wavelength spectrum (or the cutoff wavelength, which is an end-point of the green wavelength spectrum). In an embodiment, the energy bandgap of the green perovskite may be about 1.9 eV to about 2.2 eV, for example. In an embodiment, the green perovskite may be $CH_3NH_3PbBr_3$, $CH_3NH_3Pb(I_{0.2}Br_{0.8})_3$, or any combinations thereof, for example, but is not limited thereto.

The red perovskite may have relatively high absorbance from the short wavelength (e.g., a wavelength belonging to an X-ray or UV-ray region) over a red wavelength spectrum, and a cutoff wavelength of the absorption spectrum of the red perovskite may be an end-point of the red wavelength spectrum, e.g., a boundary point of the red wavelength spectrum and an infrared wavelength spectrum. In an embodiment, the cutoff wavelength of the absorption spectrum of the red perovskite may belong to greater than about 650 nm and less than or equal to 750 nm and within the range, about 670 nm to about 730 nm, about 680 nm to about 720 nm, or about 690 nm to about 710 nm, for example. The cutoff wavelength of the absorption spectrum of the red perovskite may be determined by an energy bandgap of the perovskite, and the red perovskite may have the energy bandgap that matches the red wavelength spectrum (or a cutoff wavelength, which is an end-point of the red wavelength spectrum). In an embodiment, the energy bandgap of the red perovskite may be greater than or equal to about 1.6 eV and less than about 1.9 eV, for example. In an embodiment, the red perovskite may be, $CH_3NH_3PbI_3$, $CH_3NH_3Pb(I_{0.6}Br_{0.4})_3$, or any combinations thereof, for example, but is not limited thereto.

The charge auxiliary layers 254a, 254b, 254c, 255a, 255b, and 255c may be disposed between the lower electrodes 251a, 251b, and 251c and the photoelectric conversion layers 253a, 253b, and 253c and between the upper electrodes 252a, 252b, and 252c and the photoelectric conversion layers 253a, 253b, and 253c and may improve electrical characteristics between the lower electrodes 251a, 251b, and 251c and the photoelectric conversion layers 253a, 253b, and 253c and the upper electrodes 252a, 252b, and 252c and the photoelectric conversion layers 253a, 253b, and 253c, and the photoelectric conversion efficiency may be increased or the dark current and/or remaining charges may be lowered, for example. The charge auxiliary layers 254a, 254b, 254c, 255a, 255b, and 255c may be a hole transport layer, a hole injection layer, an electron blocking layer, an electron transport layer, an electron injection layer, a hole blocking layer, or any combinations thereof.

The blue photo-sensing device 250a, the green photo-sensing device 250b, and the red photo-sensing device 250c may be sequentially stacked from an incident direction of the light, and accordingly, the blue photo-sensing device 250a may exhibit high absorbance with respect to light of the blue wavelength spectrum out of a visible light wavelength spectrum, the green photo-sensing device 250b may exhibit high absorbance with respect to light of the green wavelength spectrum out of light passing through the blue photo-sensing device 250a, and the red photo-sensing device 250c may exhibit high absorbance with respect to light of the red wavelength spectrum out of light passing through the blue photo-sensing device 250a and the green photo-sensing device 250b. Accordingly, each of the blue photo-sensing device 250a, the green photo-sensing device 250b, and the red photo-sensing device 250c may have wavelength selectivity without a separate wavelength selective filter layer.

The second photo-sensing device 150 may be between the substrate 110 and the first photo-sensing device 250, and the blue photo-sensing device 250a, the green photo-sensing device 250b, the red photo-sensing device 250c, the second photo-sensing device 150, and the substrate 110 may be disposed from the incident direction of the light, for example.

In an embodiment, the second photo-sensing device 150, like the above embodiment, may sense light of at least a portion of the infrared wavelength spectrum, for example. In an embodiment, the second photo-sensing device 150 may be a photoelectric conversion diode and include a lower electrode 151, an upper electrode 152, a photoelectric conversion layer 153 between the lower electrode 151 and the upper electrode 152 and including a second perovskite, and charge auxiliary layers 154 and 155, for example. A detailed description of the second photo-sensing device 150 is the same as described above.

The second photo-sensing device 150 is disposed under the aforementioned first photo-sensing device 250 and may sense first light that sequentially passes through the blue photo-sensing device 250a, the green photo-sensing device 250b, and the red photo-sensing device 250c, although the absorption spectrum of the second perovskite spans from the short wavelength to the infrared wavelength spectrum, light of the visible light wavelength spectrum already absorbed by the first photo-sensing device 250 may be excluded, and light of the infrared wavelength spectrum may be selectively absorbed and photoelectrically converted.

Insulating layers 70, 60, and 62 may be respectively between the blue photo-sensing device 250a and the green photo-sensing device 250b, between the green photo-sensing device 250b and the red photo-sensing device 250c, and between the red photo-sensing device 250c and the second photo-sensing device 150, and trenches 65a, 65b, 65c, and 66 exposing charge storages 120a, 120b, 120c, and 121 may be defined in the insulating layers 70, 60, and 62. In an alternative embodiment, at least one of the insulating layers 60, 70, and 62 may be omitted.

The image sensor 300 in the embodiment may be a stacked sensor in which a plurality of sensors respectively sensing light of blue, green, red, and infrared wavelength spectra is stacked, and accordingly, compared with the image sensor 300 according to the above embodiment, the image sensor 300 have a significantly reduced size, realizing a down-sized image sensor, e.g., implementing arithmetically about 3 times improved sensitivity at the same size.

Hereinafter, another embodiment of an image sensor is described.

Figure 7:
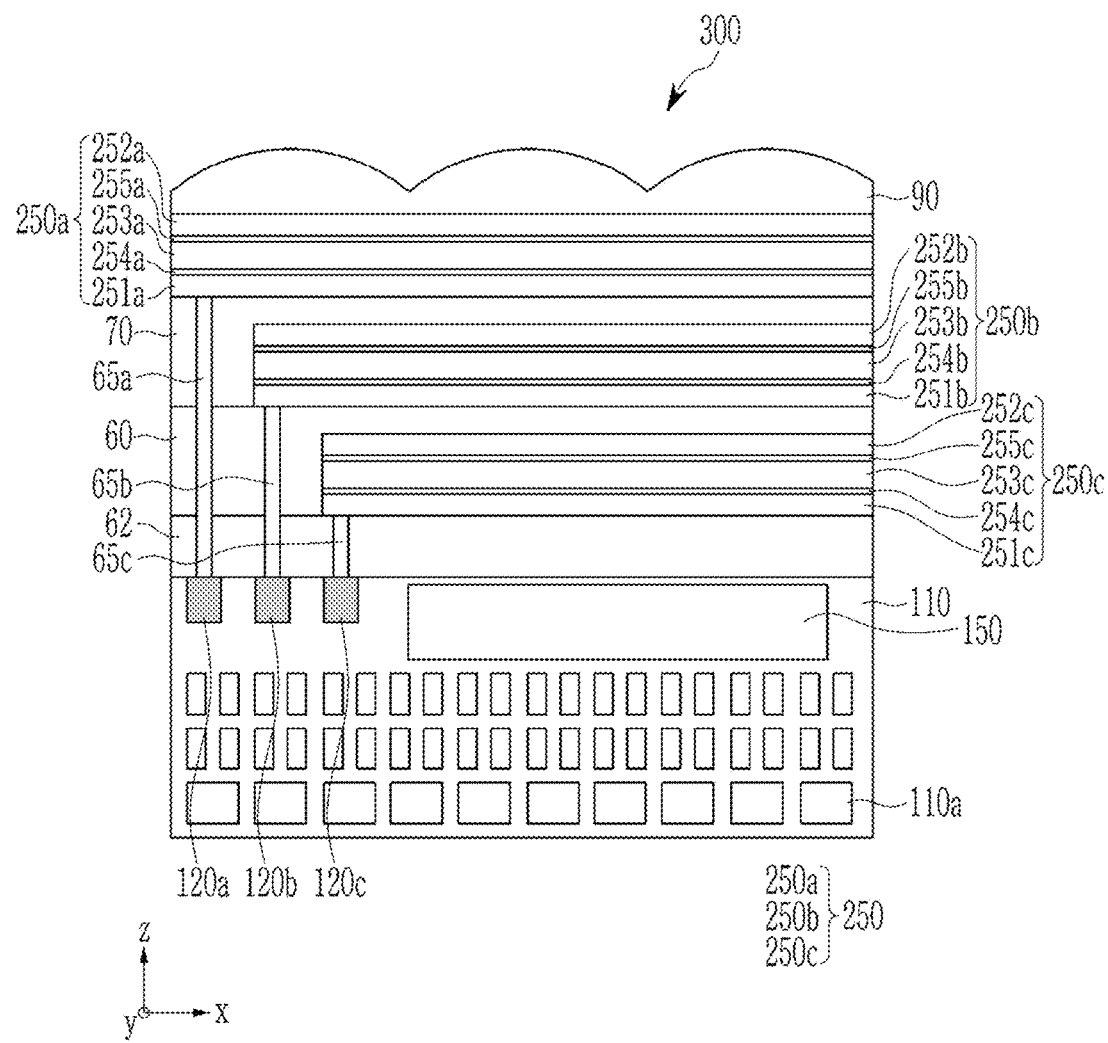
FIG. 7 is a cross-sectional view showing another embodiment of the image sensor of FIG. 5.

FIG. 7 is a cross-sectional view showing another embodiment of the image sensor of FIG. 5.

Referring to FIG. 7, an embodiment of an image sensor 300, like the aforementioned embodiment, includes a substrate 110, a first photo-sensing device 250, a second photo-sensing device 150, and a focusing lens 90. The first photo-sensing device 250 is closer to a light incident side than the second photo-sensing device 150 is, which is described later. The first photo-sensing device 250 includes a blue photo-sensing device 250a, a green photo-sensing device 250b, and a red photo-sensing device 250c stacked in a perpendicular direction (e.g., z direction) with the surface of the substrate 110.

However, in the image sensor 300 according to this embodiment, unlike the image sensor 300 according to the aforementioned embodiment, the second photo-sensing device 150 is integrated in the substrate 110. The second photo-sensing device 150 may be a silicon photo-sensing device, e.g., a silicon photodiode. The second photo-sensing device 150 may have a depth and thickness which enable to absorb light of an infrared wavelength spectrum in the substrate 110. In an embodiment, a thickness of the second photo-sensing device 150 may be about 1 μm to about 10 μm, within the above range, about 2 μm to about 8 μm, or about 2 μm to about 6 μm, for example.

Hereinafter, another embodiment of an image sensor is described.

Figure 8:
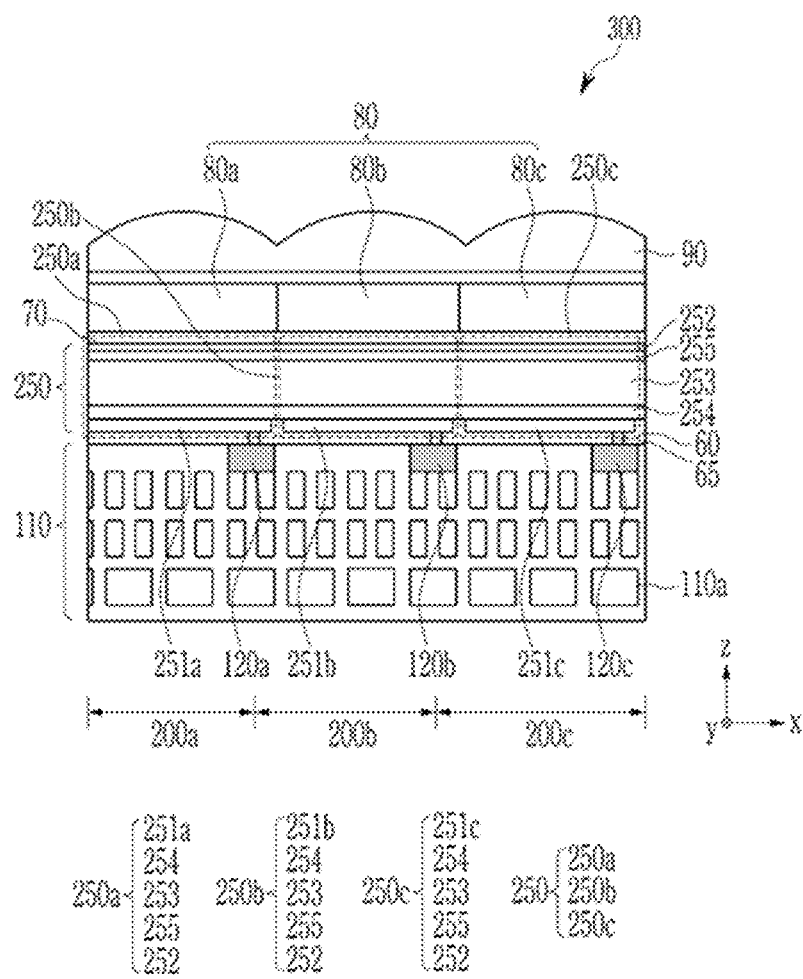
FIG. 8 is a cross-sectional view showing another embodiment of an image sensor.

FIG. 8 is a cross-sectional view showing another embodiment of an image sensor.

Referring to FIG. 8, an embodiment of the image sensor 300, like the image sensor 300 shown in FIGS. 1 and 2, includes a plurality of pixels 200 for photoelectrically converting light of first, second and third wavelength spectra which belongs to a visible light wavelength spectrum but is different from one another, and each pixel 200 may be a blue pixel 200a for selectively sensing light of a blue wavelength spectrum, a green pixel 200b for selectively sensing light of a green wavelength spectrum, and a red pixel 200c for selectively sensing light of a red wavelength spectrum.

The image sensor 300 includes a substrate 110, a first photo-sensing device 250, a wavelength selective filter layer 80, insulating layers 60 and 70, and a focusing lens 90.

The substrate 110 may be a semiconductor substrate, e.g., a silicon substrate. In an embodiment, the substrate 110 may be a CMOS substrate and may include a CMOS circuit unit 110a, for example. The substrate 110 may include charge storages 120a, 120b, and 120c, and a transmission transistor (not shown). A metal wire (not shown) and a pad (not shown) may be formed or disposed on or under the substrate 110.

The first photo-sensing device 250 includes a blue photo-sensing device 250a included in the blue pixel 200a, a green photo-sensing device 250b included in the green pixel 200b, and a red photo-sensing device 250c included in the red pixel 200c. The blue photo-sensing device 250a, the green photo-sensing device 250b, and the red photo-sensing device 250c may be aligned along a horizontal direction (e.g., xy direction) with the surface of the substrate 110 to form a visible photo-sensing device array.

The blue photo-sensing device 250a, the green photo-sensing device 250b, and the red photo-sensing device 250c respectively include each lower electrode 251a, 251b, and 251c, an upper electrode 252, a photoelectric conversion layer 253 between the lower electrodes 251a, 251b, and 251c and the upper electrode 252, and charge auxiliary layers 254 and 255 between the lower electrodes 251a, 251b, and 251c and the photoelectric conversion layer 253 and between the upper electrode 252 and the photoelectric conversion layer 253, where the lower electrodes 251a, 251b, and 251c, the upper electrode 252, the photoelectric conversion layer 253, and the charge auxiliary layers 254 and 255 are the same as described in FIGS. 1 to 3.

The photoelectric conversion layer 253 may include the above first perovskite and thus may absorb light of a blue wavelength spectrum (or light including the blue wavelength spectrum), light of a green wavelength spectrum (or light including the green wavelength spectrum), or light of a red wavelength spectrum (or light including the red wavelength spectrum) respectively transmitted through first, second, and third color filters 80a, 80b, and 80c in the first perovskite and convert the absorbed light of a visible light wavelength spectrum into electrical signals.

The lower electrodes 251a, 251b, and 251c, the upper electrode 252, the charge auxiliary layers 254 and 255, the wavelength selective filter layer 80, and the focusing lens 90 are the same as described above.

The image sensor 300 according to this embodiment may be a single-layered image sensor not having the above second photo-sensing device 150. As described above, perovskite may have about 10 times or more (e.g., about 10 times to 1000 times) higher absorbance than silicon and thus higher light absorption characteristics than a conventional single-layer silicon photodiode. In an embodiment, in order to secure the equivalent absorbance as the conventional silicon photodiode, the photoelectric conversion layer 253 including the first perovskite may have an about ⅒ or less reduced thickness, for example, compared with that of the conventional silicon photodiode, and accordingly, the single-layered image sensor 300 may also have a greatly reduced thickness and thus effectively applied as a thin image sensor.

The photoelectric conversion layer 253 including the first perovskite may have a relatively thin thickness due to such high absorbance, and may have a thickness, e.g., about 100 nm to about 800 nm, about 100 nm to about 700 nm, about 100 nm to about 500 nm, or about 300 nm to about 500 nm.

As described above, the perovskite may determine a cutoff wavelength of an absorption spectrum according to an energy bandgap and thus have wavelength selectivity. Accordingly, unlike silicon which absorbs light of a broad wavelength spectrum from a short wavelength (near about 200 nm) to an infrared wavelength spectrum without the wavelength selectivity, the photoelectric conversion layer 253 including the first perovskite may exclude light of the infrared wavelength spectrum but absorb light of a visible light wavelength spectrum without a separate infrared blocking filter.

In addition, the photoelectric conversion layer 253 including the first perovskite may have a refractive index of less than or equal to about 3.0 (e.g., the refractive index of $CH_3NH_3PbI_3$: about 2.84 @ 633 nm), which may be lower than the refractive index of silicon (about 3.88 @ 630 nm). Accordingly, since an interfacial reflectance of the photoelectric conversion layer 253 with the air is less than about 30%, less than or equal to about 28%, or less than or equal to about 25% (e.g., about 23%) based on an incident angle of 0°, while an interfacial reflectance of silicon with the air is about 35%, the photoelectric conversion layer 253 including the first perovskite instead of the silicon may be used to collect more light into the photoelectric conversion layer 253 or a separate anti-reflection coating may not be desired.

In addition, the perovskite, compared with an organic photoelectric conversion material, has about 1000 times or more (e.g., about 1000 times to about $10^6$ times) high charge mobility and thus high photoelectric conversion efficiency and low remaining charge carriers characteristics in addition to the high light absorption characteristics. Accordingly, it may be effectively applied to high-performance image sensors such as high-speed driving sensors.

In addition, the perovskite may be applied to both solution processes such as spin coating, slit coating, and inkjet coating, or deposition processes such as vacuum deposition and thermal deposition, and thus it may have less process limitations.

Hereinafter, another embodiment of an image sensor is described.

Figure 9:
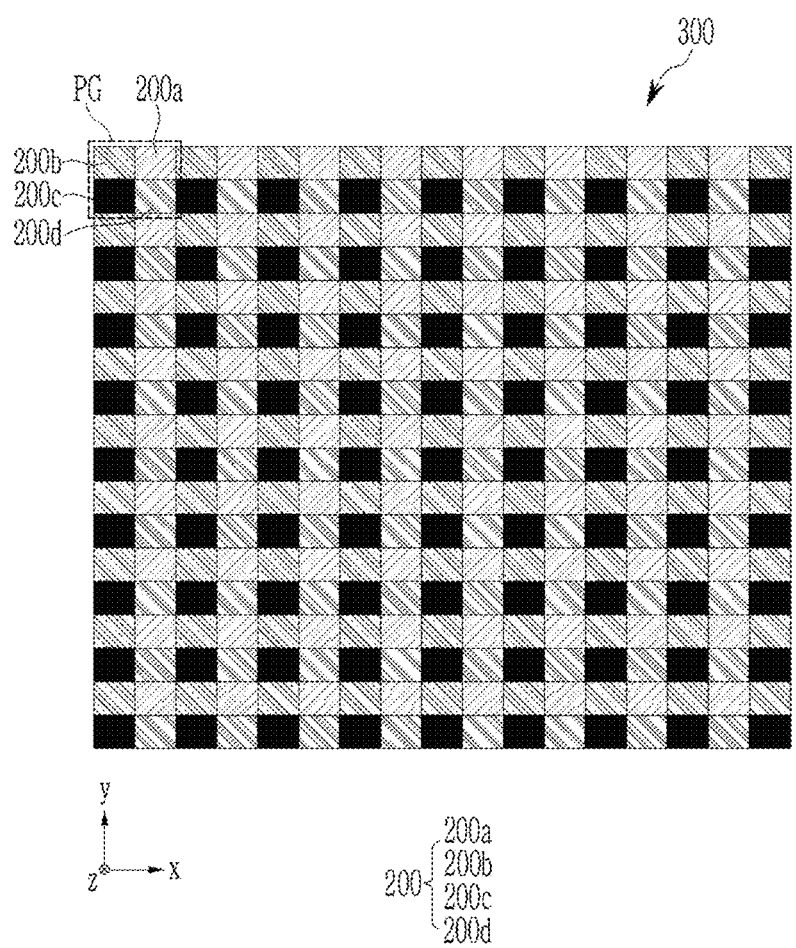
FIG. 9 is a plan view showing another embodiment of an image sensor.
Figure 10:
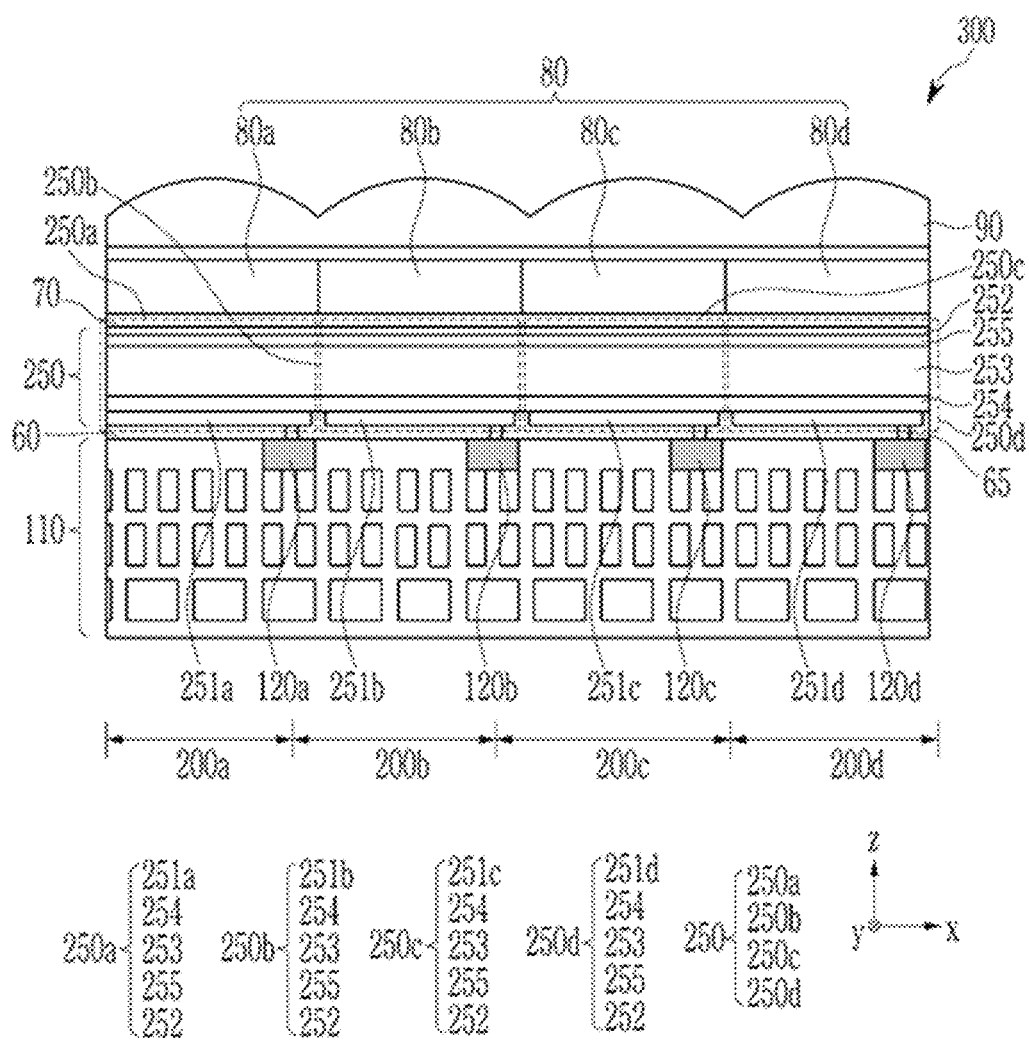
FIG. 10 is a cross-sectional view showing an embodiment of the image sensor of FIG. 9.

FIG. 9 is a plan view showing another embodiment of an image sensor, and FIG. 10 is a cross-sectional view showing an embodiment of the image sensor of FIG. 9.

Referring to FIG. 9, an embodiment of an image sensor 300, like the above embodiments, may be a single-layered image sensor and includes a plurality of pixels 200 for respectively photoelectrically converting light of each first, second, and third wavelength spectrum belonging to a visible light wavelength spectrum but differing one another, where each pixel 200 may be a blue pixel 200a for selectively sensing light of a blue wavelength spectrum, a green pixel 200b for selectively sensing light of a green wavelength spectrum, or a red pixel 200c for selectively sensing light of a red wavelength spectrum.

In an embodiment of the image sensor 300, unlike the above embodiments, the plurality of pixels 200 may further include an infrared pixel 200d. In an embodiment, one blue pixel 200a, one green pixel 200b, one red pixel 200c, and one infrared pixel 200d may form one pixel group PG and be repetitively arranged along rows and/or columns, for example. The infrared pixel 200d may absorb and then, photoelectrically convert at least a portion of light of an infrared wavelength spectrum.

Referring to FIG. 10, an image sensor 300 according to some embodiment include a substrate 110, a first photo-sensing device 250, a wavelength selective filter layer 80, insulating layers 60 and 70, and a focusing lens 90.

The substrate 110 may be a semiconductor substrate, e.g., a silicon substrate. In an embodiment, the substrate 110 may be a CMOS substrate and may include a CMOS circuit unit 110a, for example. The substrate 110 may include charge storages 120a, 120b, 120c, and 120d and a transmission transistor (not shown). A metal wire (not shown) and a pad (not shown) may be formed or disposed on or under the substrate 110.

The first photo-sensing device 250 includes a blue photo-sensing device 250a included in the blue pixel 200a, a green photo-sensing device 250b included in the green pixel 200b, a red photo-sensing device 250c included in the red pixel 200c, and an infrared photo-sensing device 250d included in the infrared pixel 200d. The blue photo-sensing device 250a, the green photo-sensing device 250b, the red photo-sensing device 250c, and the infrared photo-sensing device 250d are arranged in a horizontal direction (e.g., xy direction) with respect to the surface of the substrate 110.

The blue photo-sensing device 250a, the green photo-sensing device 250b, the red photo-sensing device 250c, and the infrared photo-sensing device 250d respectively include each lower electrode 251a, 251b, 251c, and 251d, the upper electrode 252, the photoelectric conversion layer 253 between the lower electrodes 251a, 251b, 251c, and 251d and the upper electrode 252, and the charge auxiliary layers 254 and 255 between the lower electrodes 251a, 251b, 251c, and 251d and the photoelectric conversion layer 253 and between the upper electrode 252 and the photoelectric conversion layer 253, where the lower electrodes 251a, 251b, 251c, and 251d, the upper electrode 252, the photoelectric conversion layer 253, and the charge auxiliary layers 254 and 255 are the same as described in FIGS. 1 to 3.

The photoelectric conversion layer 253 may include the aforementioned first perovskite. In this embodiment, the first perovskite may absorb light from the visible light wavelength spectrum to the infrared wavelength spectrum.

In an embodiment, the absorption spectrum of the first perovskite may have a relatively high absorbance from a short wavelength (e.g., a wavelength belonging to an X-ray or UV-ray region) to an infrared wavelength spectrum, for example. The first perovskite may have an energy bandgap that matches the infrared wavelength spectrum.

In an embodiment, the cutoff wavelength of the absorption spectrum of the first perovskite wavelength may be an end-point of the infrared wavelength spectrum to be photoelectrically converted by the infrared photo-sensing device 250d and may belong to about 800 nm to about 3000 nm, within the above range, about 800 nm to about 2500 nm, about 800 nm to about 2200 nm, about 800 nm to about 2000 nm, about 800 nm to about 1800 nm, about 800 nm to about 1500 nm, about 800 nm to about 1300 nm, about 900 nm to about 2500 nm, about 900 nm to about 2200 nm, about 900 nm to about 2000 nm, about 900 nm to about 1800 nm, about 900 nm to about 1500 nm, about 900 nm to about 1300 nm, about 1000 nm to about 2500 nm, about 1000 nm to about 2200 nm, about 1000 nm to about 2000 nm, about 1000 nm to about 1800 nm, about 1000 nm to about 1500 nm, or about 1000 nm to about 1300 nm, for example.

The wavelength selective filter layer 80 may include a first color filter 80a included in the blue pixel 200a, a second color filter 80b included in the green pixel 200b, and a third color filter 80c included in the red pixel 200c and additionally, an infrared filter 80d included in an infrared pixel 200d.

As described above, the first, second, and third color filters 80a, 80b, and 80c may differ from one another, and the first color filter 80a may be a blue filter, a cyan filter, or a magenta filter, the second color filter 80b may be a green filter, a cyan filter, or a yellow filter, and the third color filter 80c may be a red filter, a yellow filter, or a magenta filter. In an embodiment, the first, second, and third color filters 80a, 80b, and 80c may be a blue filter, a green filter, and a red filter, respectively, for example. In an embodiment, the first, second, and third color filters 80a, 80b, and 80c may be a cyan filter, a yellow filter, and a magenta filter, respectively.

The infrared filter 80d may selectively transmit light of a predetermined infrared wavelength spectrum, and may selectively transmit light of an infrared wavelength spectrum to be photoelectrically converted by the infrared photo-sensing device 250d, for example. In an embodiment, the infrared filter 80d may selectively transmit light of a wavelength spectrum of greater than about 700 nm and less than or equal to 3000 nm, within the above range, greater than about 700 nm and less than or equal to about 2500 nm, greater than about 700 nm and less than or equal to about 2000 nm, greater than about 700 nm and less than or equal to about 1800 nm, greater than about 700 nm and less than or equal to about 1500 nm, about 750 nm to about 3000 nm, about 750 nm to about 2500 nm, about 750 nm to about 2000 nm, about 750 nm to about 1800 nm, about 750 nm to about 1500 nm, about 800 nm to about 3000 nm, about 800 nm to about 2500 nm, about 800 nm to about 2000 nm, about 800 nm to about 1800 nm, or about 800 nm to about 1500 nm, for example, but is not limited thereto.

The image sensor 300 in the embodiment, as described above, includes a photo-sensing device including perovskite and thus may have about 10 times or more (e.g., about 10 times to about 1000 times) higher absorbance, than silicon and thus higher light absorption characteristics than a conventional single-layered silicon photodiode. Additionally, the image sensor 300 in the embodiment may further include the infrared pixel 200d and thus improve sensitivity in a low-light environment and also, broaden a dynamic range differentiating black and white details and thus effectively increase sensing ability of a three-dimensional image. In addition, the image sensor 300 may additionally include an infrared pixel and have a function of a security sensor, a vehicle sensor, or a biometric sensor.

The photoelectric conversion layer 253 including the first perovskite may have a relatively thin thickness due to such high absorbance, and may have a thickness, e.g., about 100 nm to about 800 nm, about 100 nm to about 700 nm, about 100 nm to about 500 nm, or about 300 nm to about 500 nm.

As described above, an energy bandgap of the perovskite may determine a cutoff wavelength of an absorption spectrum and thus wavelength selectivity. Accordingly, unlike silicon which absorbs light of a broad wavelength spectrum from a short wavelength (near about 200 nm) to an infrared wavelength spectrum without wavelength selectivity, the photoelectric conversion layer 253 including the first perovskite may exclude light of the infrared wavelength spectrum but may absorb light of a visible light wavelength spectrum without a separate infrared blocking filter.

In addition, the photoelectric conversion layer 253 including the first perovskite may have a refractive index of less than or equal to about 3.0 (e.g., the refractive index of $CH_3NH_3PbI_3$: about 2.84 @ 633 nm), which may be lower than the refractive index of silicon (about 3.88 @ 630 nm). Accordingly, since an interfacial reflectance of the photoelectric conversion layer 253 with the air, based on an incident angle of 0°, is less than about 30%, less than or equal to about 28%, or less than or equal to about 25% (e.g., about 23%), while an interfacial reflectance of silicon with the air is about 35%, the photoelectric conversion layer 253 including the first perovskite instead of the silicon may be used to collect more light into the photoelectric conversion layer 253 or a separate anti-reflection coating film may not be desired.

In addition, the perovskite has about 1000 times or more (e.g., about 1000 times to about $10^6$ times) higher charge mobility than an organic photoelectric conversion material and thus may have high photoelectric conversion efficiency and low remaining charge carriers characteristics in addition to the aforementioned high light absorption characteristics. Accordingly, it may be effectively applied to high-performance image sensors such as high-speed driving sensors.

In addition, the perovskite may be applied to both solution processes such as spin coating, slit coating, and inkjet coating, or deposition processes such as vacuum deposition and thermal deposition, and thus it may have less process limitations.

Additionally, the image sensor 300 in the embodiment may have a function of a security sensor, a vehicle sensor, or a biometric sensor by additionally including an infrared pixel. Accordingly, an in-pixel image sensor that realizes an image by simultaneously sensing light in the visible light region and light in the infrared region within one pixel may be implemented. Therefore, unlike the structure in which the visible light sensor and the infrared light sensor are manufactured on separate substrates, sensitivity in a low-light environment may be improved without increasing the size of the image sensor 300, and by widening a dynamic range that separates black and white details, sensing ability of a three-dimensional image may be effectively increased. In addition, the infrared light sensor may be used as a security sensor, a vehicle sensor, or a biometric sensor, and may be used as a combination sensor having a combination function of an image sensor, a security sensor, a vehicle sensor, or a biometric sensor due to the aforementioned integrated structure of the visible light sensor and the infrared light sensor. In an embodiment, the biometric sensor may be an iris sensor, a depth sensor, a fingerprint sensor, or a blood vessel distribution sensor, for example, but is not limited thereto.

The aforementioned image sensors may be included in an imaging device such as a camera, and such an image sensor and/or camera may be applied to various electronic devices such as smartphone, mobile phone, tablet personal computer ("PC"), laptop PC, desktop PC, e-book, navigation device, television ("TV"), personal digital assistant ("PDA"), portable multimedia player ("PMP"), enterprise digital assistant ("EDA"), wearable computers, Internet of Things ("IoT") devices, Internet of Everything ("IoE"), drones, digital cameras, door locks, safes, automated teller machines ("ATMs"), security devices, medical devices, or automotive electronic components.

Figure 11:
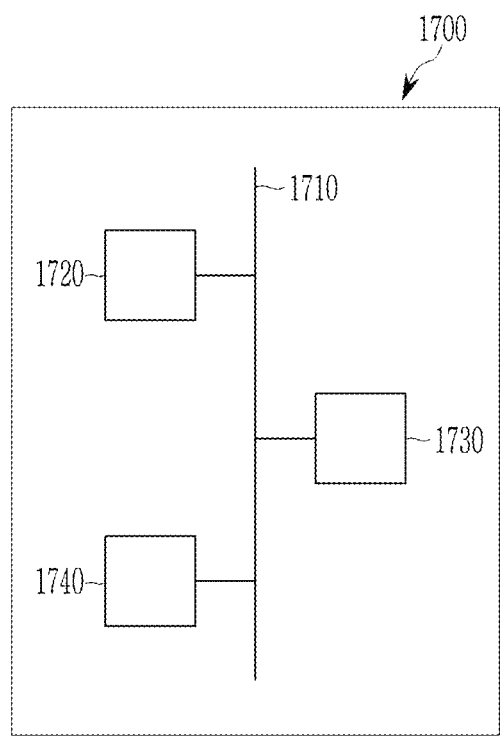
FIG. 11 is a schematic diagram of an embodiment of an electronic device.

FIG. 11 is a schematic diagram of an embodiment of an electronic device.

Referring to FIG. 11, an electronic device 1700 may include a processor 1720, a memory 1730, and an image sensor 1740 that are electrically coupled together via a bus 1710. The image sensor 1740 may be the same as described above. The memory 1730, which may be a non-transitory computer readable medium, may store a program of instructions. The processor 1720 may execute the stored program of instructions to perform one or more functions. In an embodiment, the processor 1720 may process electrical signals generated by the organic sensor 1740, for example. The processor 1720 may generate an output (e.g., an image to be displayed on a display interface) based on such as processing.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An image sensor, comprising:
   a substrate;
   a plurality of pixels disposed on the substrate and including a blue pixel, a green pixel, and a red pixel, at least a portion of the plurality of pixels comprising:
   a first photo-sensing device including:
   a first electrode and a second electrode,
   a first photoelectric conversion layer between the first electrode and the second electrode, the first photoelectric conversion layer including a material including a first perovskite which absorbs at least a portion of light in a visible light wavelength spectrum, and
   a charge auxiliary layer disposed at least one of between the first electrode and the first photoelectric conversion layer and between the second electrode and the first photoelectric conversion layer; and
   a second photo-sensing device which is stacked with the first photo-sensing device and senses at least a portion of light in an infrared wavelength spectrum.

2. The image sensor of claim 1,
   wherein
   the first photo-sensing device comprises a blue photo-sensing device included in the blue pixel, a green photo-sensing device included in the green pixel, and a red photo-sensing device included in the red pixel, and
   the blue photo-sensing device, the green photo-sensing device, and the red photo-sensing device are arranged in a first direction parallel to a surface of the substrate or a second direction perpendicular to the surface of the substrate.

3. The image sensor of claim 2, wherein
   the blue photo-sensing device, the green photo-sensing device, and the red photo-sensing device are arranged in the first direction with respect to the surface of the substrate, and the image sensor further comprises a wavelength selective filter layer including a first color filter on the blue photo-sensing device, a second color filter on the green photo-sensing device, and a third color filter on the red photo-sensing device.

4. The image sensor of claim 3, wherein a cutoff wavelength of the absorption spectrum of the first perovskite is greater than about 650 nanometers and less than about 750 nanometers.

5. The image sensor of claim 3, wherein
the first, second, and third color filter are different from each other,
the first color filter is a blue filter, a cyan filter, or a magenta filter,
the second color filter is a green filter, a cyan filter, or a yellow filter, and
the third color filter is a red filter, a yellow filter, or a magenta filter.

6. The image sensor of claim 2, wherein
the blue photo-sensing device, the green photo-sensing device, and the red photo-sensing device are stacked in a direction perpendicular to the surface of the substrate, and
the first perovskite comprises
a blue perovskite having a cutoff wavelength of an absorption spectrum at a boundary between a blue wavelength spectrum and a green wavelength spectrum,
a green perovskite having a cutoff wavelength of an absorption spectrum at a boundary between a green wavelength spectrum and a red wavelength spectrum, and
a red perovskite having a cutoff wavelength of an absorption spectrum at a boundary between a red wavelength spectrum and an infrared wavelength spectrum.

7. The image sensor of claim 6, wherein
the cutoff wavelength of the absorption spectrum of the blue perovskite belongs to greater than or equal to about 450 nanometers and less than about 550 nanometers,
the cutoff wavelength of the absorption spectrum of the green perovskite belongs to about 550 nanometers to about 650 nanometers, and
the cutoff wavelength of the absorption spectrum of the red perovskite belongs to greater than about 650 nanometers and less than or equal to 750 nanometers.

8. The image sensor of claim 1, wherein the second photo-sensing device is integrated in the substrate or disposed on the substrate.

9. The image sensor of claim 1, wherein the second photo-sensing device is a silicon photo-sensing device.

10. The image sensor of claim 9, wherein a thickness of the second photo-sensing device is about 1 micrometer to about 10 micrometer.

11. The image sensor of claim 1, wherein
the second photo-sensing device comprises a second perovskite, the second perovskite being different from the first perovskite, and
a cutoff wavelength of an absorption spectrum of the second perovskite ranges from about 800 nanometers to about 3000 nanometers.

12. The image sensor of claim 11, wherein a thickness of the second photo-sensing device is greater than or equal to about 100 nanometers and less than about 1 micrometer.

13. The image sensor of claim 1, wherein
the second photo-sensing device comprises:
a third electrode and a fourth electrode, and
a second photoelectric conversion layer between the third electrode and the fourth electrode and comprising a second perovskite, the second perovskite having a cutoff wavelength of an absorption spectrum belonging to about 800 nanometers to about 3000 nanometers.

14. The image sensor of claim 13, wherein the second photo-sensing device further comprises a charge auxiliary layer disposed at at least one of between the third electrode and the second photoelectric conversion layer and between the fourth electrode and the second photoelectric conversion layer.

15. The image sensor of claim 1, further comprising:
a focusing lens on the first photo-sensing device, and
a complementary metal-oxide semiconductor circuit unit under the second photo-sensing device.

16. A camera comprising the image sensor of claim 1.

17. An electronic device comprising the camera of claim 16.

18. An electronic device comprising the image sensor of claim 1.

19. An image sensor comprising
a complementary metal-oxide semiconductor substrate,
a first photo-sensing device on the complementary metal-oxide semiconductor substrate, the first photo-sensing device comprising:
a first electrode and a second electrode, and
a photoelectric conversion layer between the first electrode and the second electrode and comprising a material including a first perovskite, the first perovskite having a cutoff wavelength of an absorption spectrum of about 700 nanometers to about 3000 nanometers;
a charge auxiliary layer disposed at least one of between the first electrode and the photoelectric conversion layer and between the second electrode and the photoelectric conversion layer, and
a wavelength selective filter layer on the first photo-sensing device and comprising a plurality of color filters, the plurality of color filters being selected from a blue filter, a green filter, a red filter, a cyan filter, a yellow filter, and a magenta filter.

20. The image sensor of claim 19, wherein the wavelength selective filter layer further comprises an infrared filter.

21. The image sensor of claim 20, wherein the complementary metal-oxide semiconductor substrate does not comprise a silicon photo-sensing device.

22. The image sensor of claim 19, further comprising a second photo-sensing device which is stacked with the first photo-sensing device and senses light of a longer wavelength spectrum than that of the first photo-sensing device.

23. The image sensor of claim 22, wherein the second photo-sensing device is integrated in the complementary metal-oxide semiconductor substrate or disposed on the complementary metal-oxide semiconductor substrate.

24. The image sensor of claim 22, wherein the second photo-sensing device is a silicon photo-sensing device or comprises a second perovskite having a cutoff wavelength longer than the cutoff wavelength of the absorption spectrum of the first perovskite.

25. The image sensor of claim 22, wherein
the second photo-sensing device comprises
a third electrode and a fourth electrode on the substrate, and a photoelectric conversion layer between the third electrode and the fourth electrode and comprising a second perovskite, the second perovskite having a cutoff wavelength which is longer than the cutoff wavelength of the absorption spectrum of the first perovskite and belongs to about 800 nanometers to about 3000 nanometers.

26. A camera comprising the image sensor of claim 19.

27. An electronic device comprising the camera of claim 26.

28. An electronic device comprising the image sensor of claim 19.

* * * * *